United States Patent Office 3,580,855
Patented May 25, 1971

3,580,855
PROCESS FOR INHIBITION OF SCALE AND CORROSION USING A POLYFUNCTIONAL PHOSPHATED POLYOL ESTER HAVING AT LEAST 75% PRIMARY PHOSPHATE ESTER GROUPS
James C. Mickus, Bloomington, Minn., David B. Fordyce, Moorestown, N.J., and Richard C. Mansfield, Warminster, Pa., assignors to Rohm and Haas Company, Philadelphia, Pa.
No Drawing. Continuation-in-part of application Ser. No. 576,252, Aug. 31, 1966. This application Apr. 9, 1969, Ser. No. 814,818
Int. Cl. C02b 5/06; C07f 9/08
U.S. Cl. 252—181                                   6 Claims

ABSTRACT OF THE DISCLOSURE

The invention is concerned with methods for maintaining an effective corrosion-inhibiting environment in aqueous systems, for preventing precipitation of Fe(II) from such systems, and for dispersing water-insoluble solids in aqueous suspension, said methods involving the treatment of the water systems with small amounts of a specific polyfunctional phosphated polyol ester characterized in that the ester has at least about 75% primary phosphate ester groups.

---

This application is a continuation-in-part of our application Ser. No. 576,252 filed Aug. 31, 1966, now abandoned.

This invention relates to new processes concerned with inhibiting the corrosion and scaling of metals, inhibiting the precipitation of iron dissolved in water, and dispersing solids suspended in aqueous systems. In particular, the invention is concerned with the treatment of waters to reduce the corrosion of ferrous or non-ferrous materials, so retard the formation of scales on the surface of the metals and to remove such scales once they are formed. Another area to which the invention relates is the prevention of the precipitation of dissolved iron existing as Fe(II) by restricting its oxidation to Fe(III). Still another area of interest is the dispersion of pigments and other solids suspended in aqueous systems.

With regard to corrosion inhibition, it has long been known to treat cooling waters with a soluble chromate such as $Na_2Cr_2O_7 \cdot 2HOH$. Chromates, either by themselves or admixed with a soluble zinc compound, a molecularly dehydrated alkali metal inorganic polyphosphate, or both, are quite effective inhibitors of metal corrosion in circulating water systems. The use of such materials is ample described in U.S. Pat. 3,223,620. However, serious problems are found with chromate-based inhibitors, e.g., staining, toxicity, and the inability to function in an aqueous medium which contains reducing contaminants.

The problem of staining is especially important in metropolitan areas where buildings and other edifices are frequently marred by the yellow color of chromates blown from cooling towers using chromate-based inhibitors. In rural areas, where crop farming is done in the vicinity of plants employing chromates in their re-circulating cooling water systems, the deposition of chromates on the crops has also been a serious problem for the chromates can make the food highly toxic and therefore inedible. In areas where reducing agents are employed in the cooling water make-up supply, or scrubbed from the air ($SO_2$, $H_2S$, etc.), the reduction product, chromium(III) ion, offers little or no inhibiting action.

Another serious problem caused by the use of chromates exists in the health hazards created to workers handling such materials due to superficial contact and inhalation of chromate-containing dust and mists. The danger to humans, animals and marine life is aggravated by the blow-down of chromates from circulating water systems which eventually flow into rivers, lakes, etc., and consequently are a potential pollutant of natural water supplies.

The chromate pollution of our natural waters has caused a demand for an adequate and relatively non-toxic replacement for the chromate corrosion inhibitors. One of the substitutes which has been proposed is the class of materials known as alkali metal inorganic polyphosphates, such as sodium pyrophosphate, sodium tripolyphosphate and sodium hexametaphosphate. These compounds, either alone or supplemented with a soluble zinc compound, presently are being used in areas where chromate-based inhibitors no longer are allowed. Unfortunately, the inorganic polyphosphate are far inferior corrosion inhibitors in comparison with the chromates. Besides being a less efficient inhibitor for corrosion of metals, the inorganic polyphosphates are objectionable because of their reversion to orthophosphate. The orthophosphates react with the calcium(II) ions in the cooling water, thereby forming a tenaciously adherent scale on the surface of heat exchange equipment which builds up to proportions that seriously limit heat exchange efficiencies. Moreover, orthophosphates also are known to be excellent nutrients are microbiological species which, in turn, contribute to the fouling of heat exchange surfaces in circulating cooling water systems.

In view of the foregoing problems, it is a primary object of the present invention to provide inhibitors compounds which protect against excessive corrosion on metal surfaces in water systems generally, and cooling waters specifically, without causing the staining and toxicity problems which are characteristic of the chromate inhibiting compositions.

Another object of this invention is to provide a series of corrosion-inhibiting compounds as described above, which, at concentrations of from 5 to 1000 parts per million, give to ferrous and nonferrous metals good corrosion protections in aqueous at a pH of 4.0 to 10.0.

It is an additional object of this invention to provide corrosion-inhibiting processes based upon a series of polyfunctional organophosphate compounds which, at practicable cooling water pH's and temperatures, have a marked resistance to reversion to orthophosphate.

A still further object of the invention is to provide corrosion-inhibiting process based uon a series of polyfunctional organophosphate materials supplemented with small amounts of a soluble Zn(II) salt.

A still further object of this invention is to provide processes employing a series of polyfunctional organophosphate inhibitor compounds, which processes, in addition to providing good corrosion-inhibiting performance, will have the ability to prevent build-up of the kinds of particulate matter, both inorganic and organic, usually encountered in circulating cooling water system. This includes the prevent of build-up of scale-forming materials such as $CaCO_3$, as well as adherent sludgeforming materials such as $Ca_3(PO_4)_2$.

One more object is to prevent waters containing dissolved Fe(II) from being precipitated as hydrated ferric oxide.

One further object is to provide an effective means for dispersing or deflocculating solids suspended in aqueous media.

The foregoing and other related objects are readily accomplished by treating waters with a composition which essentially consists of polyfunctional acid phosphate esters of polyols, said esters having the general formula:

$$R\text{-}(OPO_3H_2)_x$$

in which R is any remaining organic residue of a polyhydric alcohol used as the starting material and x is a number from 2 to 300.

Preferred esters of the above formula are those in which R is a) a number of ethylene groups attached through ether linkages in which the number of said ether linkages is one less than the number of said ethylene groups, and in which case x is 2, or, b) a number of propylene groups attached through ether linkages in which the number of said ether linkages is one less than the number of said propylene groups, and in which case x is a number which is equal to the said number of propylene groups plus 2, or c) 2 to 12 phenyl methylene groups, in which case x is a number which equals the number of said phenyl methylene group, or d) a residue of mixtures of essentially straight chain polyhydric alcohols having from 3 to 6 carbon atoms in chain length, in which case x is either 4 or 5, or e) a neopentyl group, in which case x is 4, or f) 2 neopentyl groups attached through an ether linkage, in which case x is 6, or g) a residue of an n-hexyl group, in which case x is 2 or 3, or h) a propylene residue, in which case x is 2, or i) a group having the configuration

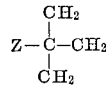

which Z is a methyl or an ethyl group, and x is 3, or j) a polyethylene residue from a polyvinyl alcohol whose 4% aqueous solution has a viscosity in the range of 2 to 25 centipoises, and in which case x is ½ to ¼ the number polyethylene groups originally in said polyvinyl alcohol.

Practically any polyhydric alcohol will be used for forming the compositions employed in the processes of the present invention. Among the more suitable alcohols are glycerol, polyglycerol (dimer, trimer, tetramer, etc.), pentaerythritol, dipentaerythritol, 2,5-hexanediol, 1,2,6-hexanetriol, polyvinyl alcohols whose 4% aqueous solutions are in the viscosity range of 2 to 25 centipoises, trimethylolethane, trimethylolpropane, 1,2-propanediol, ethylene glycol, diethylene glycol, Sutro polyols (which are commercially available mixtures of essentially straight-chain polyhydric alcohols from 3 to 6 carbon atoms in chain length), sucrose, and low molecular weight phenolic novolaks.

A preferred procedure for making the said organophosphate inhibitor compounds is to react polyphosphoric acid, which has a $P_2O_5$ content greater than 72% (and preferably between 82 and 84%), with a polyol. A residue of orthophosphoric acid and polyphosphoric acid is left upon completion of the reaction. If the $P_2O_5$ content of the polyphosphoric acid is greater than about 85% the product will also contain some esters of the formula

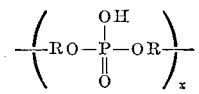

in which R is at least a fragment of the remaining residue of the polyhydric alcohol used as the starting material and x is a number from 2 to 300. In a single composition of the formula shown, the values for each R may be identical or different. Preferably, the polyfunctional phosphated polyol esters made by this method are prepared with amounts of polyphosphoric acid containing from 0.5 to about 1.0 molar equivalents of $P_2O_5$ for each equivalent of the polyhydric alcohol. By "equivalent of the polyhydric alcohol" is meant the hydroxyl equivalents of the alcohol. For example, one mole of glycerol is three equivalents thereof, one mole of pentaerythritol is four equivalents thereof, etc. A larger amount of polyphosphoric acid, i.e., an amount containing greater than one molar equivalent of $P_2O_5$ per equivalent of the polyhydric alcohol, could be used if desired. Conversion of the acid polyfunctional phosphate esters to their corresponding alkali or ammonium salts can be made by reacting the acid esters with appropriate quantities of alkali metal hydroxides or ammonium hydroxide.

An alternate procedure for preparing the polyfunctional phosphated polyols employs the use of ureaphosphate, i.e., urea mixed with orthophosphoric acid, as the phosphating agent. In preparing ureaphosphate, the preferred molar ratios of urea to orthophosphoric acid residue in the range between 1.0 and about 2.0. The urea-phosphoric acid phosphation method is especially desirable in the phosphation of low molecular weight polyvinyl alcohols, i.e., those whose 4% aqueous solutions have viscosities ranging from 2 to 25 centipoises. In preparing the esters with urea-phosphate it is preferred to employ 1 part of the polyol with 4 to 5 parts of ureaphosphate.

Still another method for preparing the polyfunctional phosphated polyols is to use phosphorus pentoxide itself as the phosphating agent, again utilizing between 0.5 and 1.0 mole of $P_2O_5$ per hydroxyl equivalent of the polyol. With this method there is one drawback, however, namely, that a mixture of primary and secondary phosphate species is obtained. Such mixtures are much more insoluble than are the polyphosphoric acid phosphated polyols which essentially contain all primary phosphate groups. However, the mixtures do exhibit metal corrosion-inhibiting properties which may be useful in many applications.

It should be understood that an essential requisite of the polyfunctional phosphated polyol esters used in the present invention is that they must have at least about 75% primary phosphate ester groups. Anything substantially less than that amount would not result in satisfactory anti-corrosive or dispersive properties. In preparing the organophosphate esters as described above and in the examples below, the methods employed are such that this minimum amount of primary phosphate ester groups is always assured.

In the methods described above, when the phosphating agents are either polyphosphoric acid or phosphorus pentoxide, the temperatures employed range from 60 to about 100° C. When ureaphosphate is employed, temperatures of at least about 160° C. must be reached in order to have the reaction go successfully. The time for the completion of the reaction in each instance is normally a direct function of the temperature which is employed. Generally, however, reacting the polyol directly with the phosphating agent takes from about 4 to 6 hours at temperatures of about 70 to 110° C. when the phosphating agent is polyphosphoric acid or phosphorus pentoxide.

Below are set forth examples which amply illustrate the manner in which the present invention is employed and the success which is achieved thereby. Since the measurement of that success was made by certain tests, a description of those tests is in order, and they will be explained prior to the description of the comparative examples.

Tests employed for evaluating effectiveness of invention one day weight loss test Inhibitor performance tests which took but a single day were made on coupons, or test panels, which consisted of a mild steel whose size was 2″ x 1″ x 0.13″. The coupons were caused to spin at an average peripheral velocity of about 1.0 ft./sec. for one day in a constant volume of water. Non-ferrous metals of similar dimensions were evaluated the same way. The water used in the test was synthetic in origin, consisting basically of 300 p.p.m. $Ca^{2+}$, 100 p.p.m. $Mg^{2+}$, both as $CaCO_3$, 500 p.p.m. $Cl^-$ and 500 p.p.m. $SO_4^{2-}$. The water was made up by dissolving suitable salts in deionized water. Alkalinity was varied from 45 to 90 p.p.m. as $CaCO_3$ by the addition of appropriate amounts of $NaHCO_3$ to the solution. The final solutions, therefore, contained from 625 to 800 p.p.m. of $Na^+$, depending upon whether the total alkalinity was brought to 90 p.p.m. or 45 p.p.m. as $CaCO_3$, respectively. The systems were tested at 120° F. at an initial pH of 7.0. Sometimes the initial pH was varied in order to obtain data on the relationships of pH versus corrosion rate.

Prior to immersion, the test coupons were machine-sanded with No. 120 emery cloth until pit free, scrubbed with soapy water and chlorine-free Bon Ami cleansing powder, rinsed in deionized water and then with acetone, and finally weighed to the nearest 0.1 mg. Upon the completion of a test, observations on the type of attack, corrosion products and pitting were made under a magnification of 20 diameters. Following these observations, the test metal coupons were cleaned up in the same manner, omitting the sanding, as they were prepared, reweighed, and the corrosion rate calculated in MPY (mils per year) from the loss in weight.

Tests over extended periods

Inhibitor performances over a 2-week period were determined in an apparatus consisting of 6 units immersed in a 120° F. constant temperature bath. Each unit was complete and independent of the others. Glass rods, each containing 6 hooks, were rotated in each test vessel. The rates of rotation could be varied such that the average peripheral velocity of the attached coupons ranged between 0 and 4 ft./sec. Each test vessel contained 2500 ml. of a corrosive test water along with initial concentrations of the inhibitor candidates ranging from 100 to 200 p.p.m. Above each test vessel was a 50-liter container of the corrosive test water having a concentration of 25-50 p.p.m. of the inhibitor candidates to help maintain the protective barrier that was formed at the high initial concentration. Make-up water with inhibitor from the 50-liter container and the test vessel into which it was automatically at the rate of 40 ml. every 18 minutes. To insure this constant rate of delivery from the containers, which varied in head pressure with time, a constant differential flow controller was placed in line between each 50-liter container and the best vessel into which it was feeding. Generally, it took about 3 days for the systems to reach a point where the inhibitor maintenance concentrations were relatively stable. A spout on each test vessel at the 2500 ml. level opened to a waste trough which took care of the overflow resulting from the periodic additions of the make-up water. Once each day the overflow was collected from each system and the water analyzed for total solids, hardness, inhibitor degradation products, etc.

Air was bubbled into each system at such a rate as to insure saturation at the temperature of the test. A coupon was withdrawn periodically and subjected to the same scrutiny as has previously been described. An MPY corrosion rate vs. time curve was subsequently made on all systems tested.

The pH was held reasonably constant over the entire test period by the addition of 2 molar sulfamic acid from time to time. The reason for the use of this acid was that it avoided introduction into the system of any anions which might form insoluble salts with the hardness cation. HCl was not used because of a desire to maintain a strict control on this aggressive corroding anion. Sulfamic acid exhibited oxidation-reduction stability with the components in the systems tested.

Tests of dispersive abilities

One-day studies were made on the settling rates of a 200 p.p.m. suspension of a kaolin clay in deionized water at temperatures varying from 25° to 80° C. and varying pH's ranging from 2 to 12. The kaolin clay, familiarly known as Barden's Clay, had an average particle size of less than 1.0 micron and a specific surface of 23.0 m.$^2$/g. (BET - Brunauer - Emmett - Teller method of measuring surface area of gas absorption). This material was studied by adding 60 ml. of the 200 p.p.m. suspensions into 200 x 25 mm. test tubes and placing them in a constant temperature bath. After the addition of the anti-coagulating inhibitor candidates at a concentration of 25 p.p.m., the suspensions were agitated vigorously by shaking in order to give a homogeneous dispersion of the suspended kaolin clay. After remaining undisturbed for 1 day, an aliquot was carefully withdrawn from the center of the test tube and the anti-coagulation efficiency was determined photometrically. The ratio of the light absorbance of the suspension (which had been carefully withdrawn from the center of the test tube) after standing undisturbed for one day, to the absorbance of an identical suspension which is agitated thoroughly and analyzed immediately without permitting time for settling, is defined as the "anti-coagulation efficiency." The concentration of the suspension was previously determined to be a direct linear function of the absorbance at a wave length of 340 m$\mu$ on a Bausch & Lomb Spectronic 20 apparatus.

EXAMPLE 1

Using the harsh, corrosive test water having the composition described above as part of the 1-day weight loss test, and an alkalinity of 90 p.p.m. as $CaCO_3$, the corrosive inhibitory performance was measured of treatments consisting of the addition to the waters of 50 to 100 p.p.m. of a PPA (polyphosphoric acid)-phosphated polyglycerol (average of 3.25 glycerol units), 50 to 100 p.p.m. PPA - phosphated Sutro-100 (5 equivalents per mole), 50 to 100 p.p.m. PPA-phosphated glycerol, 50 to 100 p.p.m. PPA-phosphated pentaerythritol, 50 to 100 p.p.m. PPA-phosphated 1,2,6-hexanetriol, and 50 to 100 p.p.m. ureaphosphate-phosphated low molecular weight poly(vinyl alcohol). All of these compounds exhibited excellent inhibitory performance, as seen by the data in Table 1 below. These compounds are clearly superior to or at least on a par with the chromate-based inhibitor systems and definitely superior to the inorganic polyphosphate inhibitor systems now in use in circulating cooling water system.

TABLE I.—COMPARISON OF CORROSION-INHIBITING EFFECTS OF VARIOUS COMPOSITIONS

[Using one day weight loss tests on mild steel [1]]

| Compositions | Initial inhibitor concentration | Corrosion rate (M.P.Y.) |
|---|---|---|
| Control (no inhibitor) | | 78.7 |
| PPA-phosphate polyglycerol (3.25 glycerol units) | 50 | 2.5 |
| PPA-phosphated Sutro-100 | 50 | 2.1 |
| 10/70 Na₂Cr₂O₇·2HOH/ZnSO₄·HOH | 50 | 6.6 |
| 60/35/5 Na₂Cr₂O₇·2HOH/Na hexametaphosphate/ZnSO₄·HOH | 50 | 3.6 |
| Tetra-Na pyrophosphate (Na₄P₂O₇) | 50 | 3.1 |
| Na tripolyphosphate (Na₅P₃O₁₀) | 50 | 49.1 |
| Na hexametaphosphate Na₂O:P₂O₅=1:1 | 50 | 19.7 |
| Na₂Cr₂O₇·2HOH | 50 | 11.5 |
| PPA-phosphated glycerol | 50 | 3.7 |
| PPA-phosphated pentaerythritol | 50 | 2.8 |
| PPA-phosphated 1,2,6-hexanetriol | 50 | 3.8 |
| Ureaphosphate-phosphated low molecular weight (about 27,500) poly (vinyl alcohol) | 50 | 8.0 |
| PPA-phosphated phenolic novolak | 100 | 7.4 |
| PPA-phosphated dipentaerythritol | 100 | 1.3 |
| PPA-phosphated ethylene glycol | 100 | 2.6 |
| PPA-phosphated diethylene glycol | 100 | 3.1 |
| PPA-phosphated hexanediol | 100 | 2.1 |
| PPA-phosphated 1,2,6-hexanetriol | 100 | 1.8 |
| PPA-phosphated trimethylolethane | 100 | 0.9 |
| PPA-phosphated trimethylolpropane | 100 | 0.7 |
| PPA-phosphated 1,2-propanediol | 100 | 0.8 |
| PPA-phosphated 1,3-propanediol | 100 | 1.0 |
| PPA-phosphated sucrose | 100 | 0.8 |

[1] pH=7.0 and temperature maintained at 120° C. in every case.

EXAMPLE 2

Two common non-ferrous metals, ETP electrolytic tough pitch copper and admiralty brass, as well as cast iron, were tested in the same harsh corrosive test water described above as part of the 1-day weight loss test. All of them were afforded good protection by employing 50 p.p.m. solutions of PPA-phosphated polyols. Table 2 below shows the inhibitor performance of the compounds of the present invention when used to protect these non-ferrous metals. Again, data on some chromate-based systems, as well as sodium hexametaphosphates, were included for comparison purposes. As Table 2 indicates, the polyfunctional organo-phosphates of the present invention performed better or at least as well as any of the prior art materials. No incidence of pitting was noted upon inspection of all of the metal coupons following the 1-day test in which 50 p.p.m. of the various polyfunctional organo phosphates were employed. Blue colorations, which are common occurrences when copper and copper-based metals are chelated, were not evident in the solution at the completion of each of the tests in which the inventive composition was employed.

TABLE 2.—COMPARISON OF CORROSION-INHIBITING EFFECTS OF VARIOUS COMPOSITIONS

[Using one day weight loss tests on copper-based metal and cast iron [1]]

| Compositions | Metals tested | Corrosion rate (M.P.Y.) |
|---|---|---|
| Control (no inhibitor) | ETP copper | 6.0 |
| | Adm. brass | 8.9 |
| | Cast iron | 9.4 |
| PPA-phosphated polyglycerol (3.25 glycerol units) | ETP copper | 4.6 |
| | Adm. brass | 4.2 |
| | Cast iron | 3.9 |
| PPA-phosphated Sutro-100 | ETP copper | 0.5 |
| | Adm. brass | 4.8 |
| | Cast iron | 2.0 |
| PPA-phosphated pentaerythritol | ETP copper | 5.3 |
| | Adm. brass | 4.6 |
| | Cast iron | 0.5 |
| 30/70 Na₂Cr₂O₇·2HOH/ZnSO₄·HOH | ETP copper | |
| | Adm. brass | 3.7 |
| | Cast iron | 3.3 |
| 60/35/5 Na₂Cr₂O₇·2HOH/Na hexametaphosphate/ZnSO₄·HOH | ETP copper | 4.3 |
| | Adm. brass | 4.6 |
| | Cast iron | 5.4 |
| Na hexametaphosphate Na₂O:P₂O₅=1:1 | ETP | 5.7 |
| | Adm. brass | 5.1 |
| | Cast iron | 3.5 |

[1] Concentration=50 p.p.m.; pH=7, and temperature=120° F. in every case.

EXAMPLE 3

To illustrate the significance of the polyfunctionality of phosphated polyols in the prevention of corrosion of mild steel, a series of 1-day weight loss tests were run employing 50 p.p.m. of mono-β-glycerol phosphate, mono-β-glycerol phosphate/Na₂HPO₄ (62.5/37.5), and PPA-phosphated glycerol, the resultant product of which, upon NaOH addition to a pH of 9.6, contained 37.5% Na₂HPO₄ by weight. Glycerol alone was also tested at a concentration of 1000 p.p.m. The results of these tests are shown in Table 3 below. It is quite evident from an inspection of the data therein that neither the monofunctional glycerol phosphate (85 MPY), the monofunctional glycerol phosphate supplemented with Na₂HPO₄ (29MPY), nor the glycerol alone gave corrosive inhibitory performances comparable with that attained by polyfunctional phosphated glycerol in accordance with the present invention.

TABLE 3

[Comparative Corrosion Inhibition of Mono- vs. Polyfunctional Phosphated Polyols (Using One Day Weight Loss Tests [1])]

| Compositions | Initial concentrate (p.p.m.) | Corrosion rate (M.P.Y.) |
|---|---|---|
| Glycerol | 1,000 | 121 |
| Mono-β-glycerol phosphate | 50 | 85 |
| Mono-β-glycerol phosphate/Na₂HPO₄ (62.5/37.5) | 50 | 29 |
| PPA-phosphated glycerol | 50 | 3.7 |

[1] pH=7.0 and temperature maintained at 120° F. in every case.

EXAMPLE 4

Since one of the major limitations to the use of inorganic polyphosphates as corrosion inhibitors is the ease with which they are hydrolyzed to orthophosphate, this example was designed to test the comparative hydrolysis to orthophosphate of those materials with the PPA-phosphated polyols of the present invention. The test consisted of bringing 0.2% solutions of each of the compounds listed in Table 4 below to the desired pH at room temperature and subjecting the solutions for one week to temperatures of 20° C., 50° C. and 60° C. At the termination of the test period these solutions were determined colorimetrically for orthophosphate by the procedure of Robertson (J. American Water Works Assoc., 52, 483–91, 1960). The percent reversion was calculated, using the amount of orthophosphate that could be formed as complete reversion and that obtained analytically as the amount of the actual reversion which took place. At the outset of the experiment, the PPA-phosphated polyglycerol contained 24.8% orthophosphate, as $PO_4$, and calculations on the extent of reversion for this composition were made on the amount of orthophosphate formed over and above this quantity. From Table 4 it can be determined that the hydrolytic stability of PPA-phosphated polyglycerol is superior to the inorganic polyphosphates at all pH's and temperatures tested in the one-week hydrolytic satbility test.

TABLE 4

[Percent reversion to orthophosphate at various temperatures and pH environment]

| Compositions | Initial pH | 20° C. | 50° C. | 60° C. |
|---|---|---|---|---|
| Na hexamethaphosphate $Na_2O \cdot P_2O_5 = 1.1)$ | 5 | 4 | 15 | 30 |
| | 6 | 4 | 14 | 36 |
| | 7 | 3 | 12 | 29 |
| | 8 | 2 | 7 | 21 |
| Na tripolyphosphate | 5 | 5 | 42 | 99 |
| | 6 | 5 | 19 | 85 |
| | 7 | 4 | 9 | 30 |
| | 8 | 2 | 4 | 14 |
| Tetra sodium-pyrophosphate | 5 | 4 | 44 | 99 |
| | 6 | 5 | 29 | 86 |
| | 7 | 3 | 9 | 43 |
| | 8 | 2 | 2 | 14 |
| PPA-phosphated polyglycerol (Average of 3.25 glycerol units) | 5 | Negative | 1 | 1 |
| | 6 | 1 | 1 | 1 |
| | 7 | 1 | Negative | 1 |
| | 8 | Negative | Negative | 1 |

EXAMPLE 5

In this example the anti-coagulating ability of the polyfunctional organophosphates employed in the process of the present invention is demonstrated. It likewise illustrates the stability at the temperatures and pH's usually encountered in cooling towers. Since a wide range of temperatures is encountered in a recirculating cooling water system, the thermosensitivity of the clay-polyfunctional organophosphate dispersion is of extreme importance. Suspended matter often is coagulated upon being warmed, and it is therefore important to observe the stabilizing effectiveness of the polyfunctional organophosphate-clay dispersions at practicable cooling tower pH's. This comparison is shown in Table 5 along with such other materials as sodium hexamethaphosphate, sodium tripolyphosphate, di-sodium hydrogen phosphate, a lower molecular weight polymethacrylate acid sodium salt, and the sodium salt of a low molecular weight diisobutylenemaleic anhydride copolymer.

Following the procedure outlined above regarding dispersion testing, the various materials were added at concentrations of 25 p.p.m. to 200 p.p.m. deionized water suspensions of Barden's Clay. The anti-coagulation efficiency of these various materials was measured at temperatures of 25°, 40° and 60° C. and pH's of 6, 7 and 8. As indicated in Table 5, the anticoagulation activity of the three PPA-phosphated polyols was found to be as good as or better than the proprietary precipitation preventatives with which they were compared over the entire range of temperatures. $Na_2HPO_4$ (orthophosphate) was found to be quite poor, especially at the higher temperatures.

TABLE 5

[Comparison of anti-coagulation efficiencies of various compositions (using previously described test for dispersive ability)]

| Compositions | pH | Temperature, ° C. | | |
|---|---|---|---|---|
| | | 25 | 40 | 60 |
| Control (no anti-coagulant added) | 6 | 4 | | |
| | 7 | 7 | 2.3 | 2.3 |
| | 8 | 6 | | |
| PPA-phosphated glycerol | 6 | 86 | 84 | 67 |
| | 7 | | 81 | |
| | 8 | 91 | 85 | 66 |
| PPA-phosphated polyglycerol | 6 | 90 | 79 | 78 |
| | 7 | 91 | 81 | 70 |
| | 8 | 91 | 88 | 69 |
| PPA-phosphated pentaerythritol | 6 | 83 | 59 | 61 |
| | 7 | | | 77 |
| | 8 | 82 | 67 | 75 |
| Na hexametaphosphate | 6 | 82 | 86 | 55 |
| | 7 | | | 67 |
| | 8 | 87 | 80 | 79 |
| Na tripolyphosphate | 6 | 86 | 79 | 71 |
| | 7 | | 73 | 70 |
| | 8 | 89 | 77 | 71 |
| $Na_2HPO_4$ | 6 | 53 | | 34 |
| | 7 | 62 | 40 | 36 |
| | 8 | 68 | 50 | 39 |
| Na salt of diisobutylene-maleic anhydride copolymer | 6 | 49 | 44 | |
| | 7 | | 42 | 35 |
| | 8 | 86 | 53 | 41 |
| Na salt of polymethacrylic acid | 6 | 63 | 44 | 52 |
| | 7 | 66 | 46 | 56 |
| | 8 | 67 | 53 | 69 |

EXAMPLE 6

In this example, a comparison was made of the sodium salts of the inhibitor compositions employed in the processes of the present invention, as supplemented by Zn(II), with compositions of the prior art. The comparison was made on the basis of the function of water hardness and alkalinity. The results, as shown in Table 6 below, clearly indicate that the sodium salt of the PPA-phosphated polyglyceryl, glyceryl, etc., which do not give adequate corroision protection to mild steel in low hardness-high alkalinity-high total solids waters, do perform satisfactorily in high hardness-low alkalinity water and also in high hardness-high alkalinity water. When supplemented with Zn(II), the PPA-phosphated polyols have shown good corrosion inhibitor performance in both high alkalinity-low hardness and low alkalinity-low hardness waters. Although the ratio of any PPA-phosphated polyol to Zn(II) necessary for optimum protection generally has to be determined for a particular water, a general rule is to employ ratios of 10:1 to 2:1 PPA-phosphated polyols to Zn(II). It is believed that hardness or other divalent ions such as zinc are necessary to form, together with orthophosphate or carbonate in waters containing high alkalinity, insoluble protective barriers on the surface of the metal. After formation of a thin layer of the insoluble barrier, the polyfunctional phosphates appear to stabilize the protective layer by adsorption, thus preventing a large buildup of scale on the metal surface.

ing agents. They were evaluated by comparing their dispersing abilities with those of well-known, standard commercial dispersants (see Table 7 below) such as the sodium salt of diisobutylene maleic anhydride copolymer, TABLE 6.—COMPARISON OF INHIBITOR PERFORMANCES OF NOVEL COMPOSITIONS WITH AND WITHOUT Zn(II) SUPPLEMENTS [1]

| Compositions | Concentration, p.p.m. | Alkalinity, p.p.m. (as $CaCO_3$) | Hardness, p.p.m. (as $CaCO_3$) | Total dissolved solids (p.p.m.) | Corrosion rate (M.P.Y.) |
|---|---|---|---|---|---|
| PPA-phosphated polyglycerol ($Na^+$ salt) | 50 | 5 | 400 | 2,000 | 4.0 |
| | 50 | 90 | 400 | 2,000 | 3.3 |
| | 50 | 90 | 2 | 1,200 | 155 |
| | 100 | 5 | 2 | 10 | 16 |
| PPA-phosphated polyglycerol ($Na^+$ salt)/Zn(II): | | | | | |
| 2/1 | 50 | 90 | 2 | 1,200 | 2.3 |
| 3/1 | 50 | 90 | 2 | 1,200 | 2.1 |
| 5/1 | 50 | 90 | 2 | 1,200 | 1.9 |
| 10/1 | 50 | 90 | 2 | 1,200 | 9.6 |
| 3/1 | 100 | 5 | 2 | 10 | 2.6 |
| 5/1 | 100 | 5 | 2 | 10 | 3.1 |
| PPA-phosphated Sutro-100 ($Na^+$ salt) | 50 | 90 | 2 | 1,200 | 124 |
| | 50 | 90 | 400 | 2,000 | 3.7 |
| PPA-phosphated Sutro-100 ($Na^+$ salt)/Zn(II)=5/1 | 50 | 90 | 2 | 1,200 | 2.0 |
| PPA-phosphated glycerol ($Na^+$ salt) | 50 | 90 | 2 | 1,200 | 110 |
| PPA-phosphated glycerol ($Na^+$ salt) | 50 | 90 | 400 | 2,000 | 3.7 |
| PPA-phosphated glycerol ($Na^+$ salt)/Zn(II)=5/1 | 50 | 90 | 2 | 1,200 | 2.1 |
| Sodium hexamethaphosphate ($Na_2O:P_2O_5=1:1$) | 620 | 90 | 400 | 2,000 | 2.2 |
| | 620 | 90 | 2 | 1,200 | 15.7 |
| | 620 | 5 | 2 | 10 | 35.2 |

[1] Initial pH is 7.0 in every instance.

EXAMPLE 7

Using the extended testing technique, described above, the effectiveness against general corrosion of mild steel of three PPA-phosphated polyols was compared with the widely accepted chromate-based treatments of the prior art. At initial inhibitor concentrations of 150 p.p.m., which leveled to 50 p.p.m. within three days, PPA-phosphated polyglyceryl, PPA-phosphated glyceryl and PPA-phosphated Sutro-100 demonstrated as good or better corrosion inhibitor performance as did two of the best known commercially available chromate-based inhibitor compositions: 7/3 by weight of $$ZnSo_4 \cdot HOH/Na_2Cr_2O_7 \cdot 2HOH$$

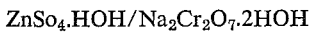

and 6/3.5/0.5 by weight of $Na_2Cr_2O_7 \cdot 2HOH$/sodium hexameta - phosphate ($Na_2O:P_2O_5=1:1$)/$ZnSO_4 \cdot HOH$. The two latter compositions were initiated at 125 p.p.m. and after three days, leveled off to their 30 p.p.m. maintenance concentrations. The pH of the PPA-phosphated polyol treatments was maintained at 6.8±0.3 while the chromate-based inhibitor treatments were held at a preferred pH of 6.5±0.3 by the periodic addition of a saturated solution of sulfamic acid ($NH_2SO_3H$). Each system utilized the same corrosive test water, 400 p.p.m. hardness and 45 p.p.m. alkalinity (both as $CaCO_3$), as was previously described. When the comparative performances of each of the treatments, together with a control which contained no inhibitor, were reduced to graphic form, the curves for all the inhibitor-treated systems followed substantially the same pattern, i.e., after an initial corrosion rate of 10–20 M.P.Y. in which a corrosion barrier was formed, a leveling off to corrosion rates of less than 1 M.P.Y. was obtained and sustained by the lower maintenance concentrations.

EXAMPLE 8

In this example, a primary and secondary triethylene glycol phosphate prepared by using $P_2O_5$, together with primary and secondary polyphosphate esters which were prepared from polyglycerol reacted with polyphosphoric acid or $P_2O_5$ and a phenolic novolak reacted with polyphosphoric acid, were evaluated for efficiency as dispersing agents. They were evaluated by comparing their dispersing abilities with those of well-known, standard commercial dispersants (see Table 7 below) such as the sodium salt of diisobutylene maleic anhydride copolymer, the sodium salt of polymethacrylic acid, and sodium hexametaphosphate.

The data in Table 7 were obtained by means of a well-known test (see U.S. Pat. 2,930,775, column 7) for the ability of certain compounds to fluidize concentrated pigment or filler suspensions or aqueous suspensions of any water-insoluble solids. In accordance with this test method, a concentrated paste of each solid was titrated with small increments of an aqueous 10% solution of the compound under test until fluidity resulted. The mixture was stirred after each increment with a high speed mixer for about ½ minute and examined for fluidity. In Table 4 there are shown in the first column various dispersants and in succeeding columns under each pigment (1) the percent of dispersant (based on weight of pigment) required for fluidity and (2) the percent of pigment in the final dispersion.

The data in Table 7 show that the triethylene glycol phosphate and the esters prepared from polyglycerol and phenolic novolaks in accordance with the present invention are comparable to the commercial dispersants based on maleic anhydride copolymers and on polymethacrylic acid. The present invention proved to have a principal advantage over sodium hexametaphosphate in that the phosphated polyols demonstrated greater hydrolytic solution stability than the hexametaphosphate when tested therefor by storing 10.0% $Na^+$ salt solutions of each at 95° C. for 24 hours and then comparing their respective dispersing abilities for $CaCO_3$. Before storage, one required 0.06% of the primary phosphated polyglycerol dispersant to achieve fluidity of the test suspensions, and 0.04% of the sodium hexametaphosphate was needed to obtain an equivalent result. After storage, the inventive composition still required 0.06%, but 2.0% of the sodium hexametaphosphate was found to be necessary to obtain the same degree of fluidity. The sodium hexametaphosphate under the conditions of the storage test had hydrolyzed and reverted to a form that was relatively ineffective as a dispersant.

Similar tests have demonstrated that as little as 0.04%, and as much as 4%, by weight of the dispersant of the present invention can fluidize in aqueous suspension all types of water-insoluble solids, including pigments, fillers, etc. The preferred amounts for this purpose, however, generally are between about 0.1% and 1.0%.

Another advantage of the phosphated polyols is that at low concentrations they do not ordinarily lower the surface tension of water to the extent that causes foaming. Consequently, foam-free concentrated aqueous pigment dispersions can readily be prepared using the phosphated polyols.

parative tests, and the data resulting therefrom, are shown in Examples 11–13 and Tables I–III below:

EXAMPLE 11

Preparation of sorbitol ester

In this run, sorbitol, in crystalline powder form, was used. With stirring, 255 grams of 85% phosphoric acid,

TABLE 7.—PERCENT DISPERSANT REQUIRED FOR FLUIDITY BASED ON WEIGHT OF PIGMENT

| Dispersant | Pigment | | | | | | | | | |
|---|---|---|---|---|---|---|---|---|---|---|
| | A | | B | | C | | D | | E | |
| | Percent dispersant | Percent[1] pigment | Percent dispersant | Percent[1] pigment | Percent dispersant | Percent[1] pigment | Percent dispersant | Percent[1] pigment | Percent dispersant | Percent[1] pigment |
| 1 Na salt of diisobutylene maleic anhydride copolymer | .06 | 71.2 | .08 | 71.1 | Ineffective | | .17 | 70.7 | .14 | 70.8 |
| 2 Na salt of polymethacrylic acid | .04 | 71.3 | .10 | 71.0 | .14 | 57.9 | .20 | 70.5 | .14 | 70.8 |
| 3 Na hexametaphosphate | .04 | 71.3 | .08 | 71.1 | .17 | 57.8 | .09 | 71.1 | .11 | 70.9 |
| 4 Primary and secondary triethylene glycol phosphate | .04 | 71.3 | .08 | 71.1 | Ineffective | | .14 | 70.8 | Ineffective | |
| 5 Primary polyglycerol phosphate | .06 | 71.2 | .06 | 71.2 | .19 | 57.7 | .12 | 70.0 | .12 | 70.9 |
| 6 Primary and secondary polyglycerol phosphate | | | .10 | 71.0 | | | | | | |
| 7 Primary novalak phosphate | | | .08 | 71.1 | | | | | | |

[1] Final pigment dispersion.
NOTE.—Pigment code:
 A=$CaCO_3$.
 B=$TiO_2$ (RA—rutile).
 C=$TiO_2$ (FF—anatase).
 D=$TiO_2$ (R-610—rutile).
 E=$TiO_2$ (Tipure 900—rutile).

EXAMPLE 9

Solutions containing 10 p.p.m. each of phosphated triglycerol, phosphated Sutro-100, and sodium hexametaphosphate were placed in three sets of 14 x 150 mm. test tubes with each set containing four test tubes. To each test tube was added enough $FeSO_4(NH_4)_2SO_4 \cdot 6H_2O$ to give a concentration of 10 p.p.m as Fe(II). The solutions were then buffered to pH's of 6, 8 and 10. A control set of four test tubes containing 10 p.p.m. Fe(II), similarly buffered but with no precipitation preventative added, was also made up. All of the solutions were set out open to the air and periodically were agitated to insure saturation with $O_2$. The solutions were checked at various times to see whether precipitates of hydrated ferric oxide had formed.

A reddish brown precipitate was formed within a few days at each pH tested in the solutions initially containing 10 p.p.m. of iron as Fe(II) with no precipitation preventative present. In the solutions having the various precipitation preventatives, no precipitate formed after two weeks. Actually, at pH's of 8 and 10, a faint yellow color is observed, indicating a hydrated Fe(III) species while water-white solutions remained at a pH of 4.

EXAMPLE 10

In this example a method is shown for the phosphorylation of polyglycerol. To 50 g. (1.06 m.) of polyglycerol (OH No.=1196; eq. wt.=47) in a nitrogen atmosphere was added slowly (with stirring and cooling to keep the temperature below 80° C.) 180 g. (1.06 m. as $P_2O_5$) of Victor Chemical Company's 115% ortho equivalent polyphosphoric acid. The mixture then was heated to 110° C. for 1 hour, while the mixture thickened, became rubbery and then liquefied. It was held another hour at 100–110° C., and then was bottled.

A surprising characteristic of the present invention is that it is selectively effective with polyfunctional organophosphates. That is, not all organophosphates will function as effectively as does the present invention. To illustrate this surprising fact the phosphated sorbitol and mannitol products disclosed in Examples 1 and 2 of U.S. Pat. 3,328,492 were tested for corrosion inhibiting properties alongside the products used in the present invention, the process employed being in each instance the novel process herein disclosed and claimed. These com- 30 grams of deionized water, and 70 grams of sorbitol were mixed. At room temperature after fifteen minutes stirring, a cloudy homogeneous solution was obtained. This was divided into two equal parts.

Part A: One half of the cloudy solution was warmed by means of an electric mantle. In the range of 120–140° F., the solution became clear. At about 220° C., a very slight yellow color had developed. After a total heating time of 5 minutes, the batch temperature was 250° F., and the solution had a definite amber color. The reaction mixture was immediately cooled in an ice bath to room temperature. The final solution was clear, with a light amber color.

Part B: Simultaneously with Part A, the second half of the cloudy mix was heated by means of an electric mantle. It again cleared and showed a slight yellow color at about 140° F. and 220° F. At the end of five minutes, the batch temperature was 250° F. It was held at about 250° F. for twenty minutes. In this time, ice cooling was required for a brief interval at the beginning to prevent a slight exotherm from developing, but the range of temperature for the entire twenty minutes was 245–250° F. At the end of twenty minutes, the batch was cooled to room temperature with an ice bath. The final solution was clear and it had a reddish, strong tea color.

EXAMPLE 12

Preparation of mannitol ester

This is a repeat of Example 11, except that mannitol was used. As in Example 11, a blend was made of 255 grams of 85% phosphoric acid, 30 grams of deionized water, and 70 grams of mannitol. The original solution was cloudy at room temperature. This cloudiness cleared up at 100° F., but no coloration occurred on heat up. In 5.5 minutes, the batch temperature was 250° F., and it was held at 248–252° F. for ten minutes. At the end of this time the mixture was cooled with an ice bath to room temperature. The final solution was clear, and it had only a very faint tinge of color, if any.

EXAMPLE 13

Corrosion tests of sorbitol and mannitol esters

Corrosion tests were conducted with a water of the following composition: total hardness ($CaCO_3$)=400 p.p.m. ($Ca^{2+}$=300 p.p.m., $Mg^{2+}$=100 p.p.m.), chloride ($Cl^-$)=620 p.p.m., sulfate ($SO_4^{2-}$)=500 p.p.m., sodium ($Na^+$)=520 p.p.m., and MO alkalinity=20–30 p.p.m.

pH on the treated systems was adjusted to pH 7.0 with added NaOH). A gang stirrer apparatus was used which imparted constant agitation to the aqueous system (120 r.p.m.) at 120° F. Two 1010 mild steel coupons were suspended from each stirrer via glass hooks. After 48 hours, coupons were removed from the individual beakers, drained, weighed and processed in the usual manner. The samples tested, their concentration in the aqueous system, their corrosion rates, and scaling deposits are listed in Tables I, II, and III. Photographs of the coupons were taken after the corrosion testing both before and after cleaning.

Table II shows that when the process of the present invention is employed, using the preferred organophosphates indicated herein, at 250 p.p.m. dosage the average corrosion rate is 1.9 M.P.Y., while all of the phosphated mannitol and sorbitol products evaluated both at 250 and 500 p.p.m. have corrosion rates in the range of 9.8 to 16.8 M.P.Y. Thus, the mannitol and sorbitol esters are clearly much poorer than the process of the present invention using the preferred organophosphates in spite of the fact that they have higher solids content, e.g., 50.8% TS vs. 72.5% TS to 73.2% TS.

Table III shows the scale deposition on the coupons from the various products tested. All of the tests using sorbitol and mannitol esters gave higher scaling values than with the present invention even though a substantial amount of the scale was lost from the sorbitol and mannitol samples because of flaking from the dried coupons.

These data conclusively prove that none of the sorbitol or mannitol esters could even approach the corrosion inhibition abilities, and provide such low scale deposition, as the present invention.

Two Day Beaker Corrosion Test

TABLE I

Process and products
of Examples No.: Concentration
1¹ _____p.p.m.___ 250
11A _____p.p.m.___ 500
11A _____p.p.m.___ 250
11B _____p.p.m.___ 500
12A _____p.p.m.___ 500
12A _____p.p.m.___ 250

¹ PPA-phosphate Sutro–100.

NOTE.—All materials weighed on a product basis.

TABLE II.—CORROSION RATE IN MPY

| | Process and Products of Examples No. | | | | | |
|---|---|---|---|---|---|---|
| -day corrosion rate | 1¹ | 11A | 11A | 11B | 12A | 12A |
| Test No. 1 | 1.87 | 16.65 | 10.81 | 16.89 | 16.19 | 9.31 |
| Test No. 2 | 1.98 | 15.66 | 10.06 | 16.79 | 14.66 | 10.36 |
| Average | 1.93 | 16.2 | 10.4 | 16.8 | 15.4 | 9.84 |

¹ PPA-phosphate Sutro–100.

TABLE III.—SCALE DEPOSITION

[Mg. scale/gm. final cleaned weight]

| | Process and Products of Examples No. | | | | | |
|---|---|---|---|---|---|---|
| -day scale weights | 1¹ | 11A | 11A | 11B | 12A | 12A |
| Test No. 1 | 0.45 | 2.11 | 0.99 | 2.68 | 2.08 | 1.12 |
| Test No. 2 | 0.48 | 1.75 | 0.80 | 2.12 | 1.97 | 1.05 |
| Average | 0.47 | 1.93 | 0.89 | 2.40 | 2.02 | 1.08 |

¹ PPA-phosphated Sutro–100.

NOTE.—The reported scale weights on coupons in 11A, 11B and 12A are low due to flaking off of scale in the test beakers and upon drying.

We claim:

1. A process for maintaining a non-corrosive, non-scaling environment in water systems and for preventing the settling, on the surfaces of metals in such systems, of the type of particulate matter usually found in water, which comprises the steps of treating said systems with from 5 to 1000 parts per million parts of the water of a composition consisting essentially of a polyfunctional phosphated polyol ester having at least about 75% primary phosphate ester groups and prepared by phosphation with polyphosphoric acid having at least 72% up to 85% $P_2O_5$, using from 0.5 to about 1 molar equivalent of the polyhydric alcohol, and the pH of said system being maintained in the range of 4.0 to 10.0 whereby the resulting ester is an alkali metal or an ammonium salt of the reaction product between a polyol and polyphosphoric acid, said acid having a $P_2O_5$ content greater than 72%, and said polyol being a member of the class consisting of glycerol, diglycerol, triglycerol, tetraglycerol, pentaerythritol, dipentaerythritol, 2,5-hexanediol, 1,2,6-hexanetriol, a polyvinyl alcohol whose 4% aqueous solution has a viscosity in the range of 2 to 25 centipoises, trimethylolethane, 1,2-propanediol, 1,3-propanediol, ethylene glycol, diethylene glycol, a mixture of essentially straightchain polyhydric alcohols having from 3 to 6 carbon atoms in chain length, and a low molecular weight phenolic novolak.

2. The process of claim 1 in which the pH is maintained in the range of 4.0 to 8.0.

3. The process of claim 1 in which the ester has been converted to its corresponding alkali metal salt and then combined with Zn(II) ions in the ratio of 10:1 to 2:1 polyphosphoric acid-phosphated polyols:Zn(II).

4. A process for maintaining a non-corrosive, non-scaling environment in water systems and for preventing the settling, on the surfaces of metals in such systems, of the type of particulate matter usually found in water, and for preventing precipittion of Fe(II) which is dissolved in water, and thereby combatting build-up of hydrated ferric oxide deposits that can give rise to differential aeration type corrosion of ferrous and non-ferrous metals, which comprises adding to the water from 1 to 10 parts of Composition X per each part of dissolved iron present in the water, and said Composition X consisting of a polyfunctional phosphated polyol ester, prepared by phosphation with polyphosphoric acid having at least 72% and up to 85% $P_2O_5$ using from 0.5 to about 1 molar equivalent of $P_2O_5$ for each equivalent of the polyhydric alcohol, and having at least about 75% primary phosphate ester groups and having the formula $$R(OPO_3H_2)_x$$

in which R is (a) a number of ethylene groups attached through ether linkages in which the number of said ether linkages is one less than the number of said ethylene groups, and in which case $x$ is 2, or, (b) a number of propylene groups attached through ether linkages in which the number of said ether linkages is one less than the number of said propylene groups, and in which case $x$ is a number which is equal to the said number of propylene groups plus 2, or (c) 2 to 12 phenyl methylene groups, in which case $x$ is a number which equals the number of said phenyl methylene groups, or (d) a residue of mixtures of essentially straight chain polyhydric alcohols having from 3 to 6 carbon atoms in chain length, in which case $x$ is either 4 or 5, or (e) a neopentyl group, in which case $x$ is 4, or (f) 2 neopentyl groups attached through an ether linkage, in which case $x$ is 6, or (g) a residue of an n-hexyl group, in which case $x$ is 2 or 3, or (h) a propylene residue, in which case $x$ is 2, or (i) a group having the configuration

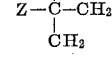

which Z is a methyl or an ethyl group, and $x$ is 3, or (j) a polyethylene residue from a polyvinyl alcohol whose 4% aqueous solution has a viscosity in the range of 2 to 25 centipoises, and in which case $x$ is ½ to ¼ the number of polyethylene groups originally in said polyvinyl alcohol.

5. The process of claim 4 in which the ester has been converted to its corresponding alkali metal salt and then combined with ZN(II) ions in the ratios of 10:1 to 2:1 phosphated polyols:Zn(II).

6. A process for dispersing water-insoluble solids in an aqueous suspension which comprises adding to the suspension from about 0.04% by weight of a polyfunctional phosphated polyol ester, prepared by phosphation with polyphosphoric acid having at least 72% and up to 85% $P_2O_6$ using from 0.5 to about 1 molar equivalent of $P_2O_5$ for each equivalent of the polyhydric alcohol, and having at least about 75% primary phosphate ester groups and having the formula $$R(-OPO_3H_2)_x$$

in which R is (a) a number of ethylene groups attached through ether linkages in which the number of said ether linkages is one less than the number of said ethylene groups, and in which case $x$ is 2, or,
(b) a number of propylene groups attached through ether linkages in which the number of said ether linkages is one less than the number of said propylene groups, and in which case $x$ is a number which is equal to the said number of propylene groups plus 2, or
(c) 2 to 12 phenyl methylene groups, in which case $x$ is a number which equals the number of said phenyl methylene groups, or
(d) a residue of mixtures of essentially straight chain polyhydric alcohols having from 3 to 6 carbon atoms in chain length, in which case $x$ is either 4 or 5, or
(e) a neopentyl group, in which case $x$ is 4, or
(f) 2 neopentyl groups attached through an ether linkage, in which case $x$ is 6, or
(g) a residue of an n-hexyl group, in which case $x$ is 2 or 3, or
(h) a propylene residue, in which case $x$ is 2, or
(i) a group having the configuration

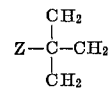

which Z is a methyl or an ethyl group, and $x$ is 3, or
(j) a polyethylene residue from a polyvinyl alcohol whose 4% aqueous solution has a viscosity in the range of 2 to 25 centipoises, and in which case $x$ is ½ to ¼ the number of polyethylene groups originally in said polyvinyl alcohol.

References Cited
UNITED STATES PATENTS

| | | | |
|---|---|---|---|
| 3,223,620 | 12/1965 | Oberhofer | 210—30 |
| 3,328,492 | 6/1967 | Gleason | 260—924 |
| 3,462,365 | 8/1969 | Vogelsang | 252—180X |

JOHN T. GOOLKASIAN, Primary Examiner

M. E. McCAMISH, Assistant Examiner

U.S. Cl. X.R.

134—2; 210—57; 252—87, 389; 260—928, 929

UNITED STATES PATENT OFFICE
CERTIFICATE OF CORRECTION

Patent No. 3,580,855          Dated May 25, 1971

Inventor(s) James C. Mickus, David B. Fordyce, Richard C. Mansfield

It is certified that error appears in the above-identified patent and that said Letters Patent are hereby corrected as shown below:

In the claims, change claim 1 to read:

1. A process for maintaining a non-corrosive, non-scaling environment in water systems and for preventing the settling, on the surfaces of metals in such systems, of the type of particulate matter usually found in water, which comprises the steps of treating said systems with from 5 to 1000 parts per million parts of the water of a composition consisting essentially of a polyfunctional phosphated polyol ester having at least about 75% primary phosphate ester groups and prepared by phosphation with polyphosphoric acid having at least 72% up to 85% $P_2O_5$, using from 0.5 to about 1 molar equivalent of $P_2O_5$ for each equivalent of the polyhydric alcohol, and the pH of said system being maintained in the range of 4.0 to 10.0 whereby the resulting ester is an alkali metal or an ammonium salt of the reaction product between a polyol and polyphosphoric acid, said acid having a $P_2O_5$ content greater than 72%, and said polyol being a member of the class consisting of glycerol, diglycerol, triglycerol, tetraglycerol, pentaerythritol, dipentaerythritol, 2,5-hexanediol, 1,2,-6-hexanetriol, a polyvinyl alcohol whose 4% aqueous solution has a viscosity in the range of 2 to 25 centipoises, trimethylolethane trimethylolpropane, 1,2-propanediol, 1,3-propanediol, ethylene glycol, diethylene glycol, a mixture of essentially straight-chain polyhydric alcohols having from 3 to 6 carbon atoms in chain length, and a low molecular weight phenolic novolak.

Signed and sealed this 29th day of August 1972.

(SEAL)
Attest:

EDWARD M. FLETCHER, JR.
Attesting Officer

ROBERT GOTTSCHALK
Commissioner of Patents